United States Patent
Shen et al.

[11] 3,903,083
[45] Sept. 2, 1975

[54] 3,3A-DIHYDRO-2H,9H-ISOXAZOLO(3,2-B)(1,3)BENZOXAZIN-9-ONES
[75] Inventors: Tsung-Ying Shen, Westfield; Howard Jones, Holmdel, both of N.J.
[73] Assignee: Merck & Co., Inc., Rahway, N.J.
[22] Filed: Nov. 19, 1973
[21] Appl. No.: 483,482

[52] U.S. Cl. ............... 260/244; 424/232; 424/248
[51] Int. Cl.² ..................... A01N 9/00; A01N 9/22
[58] Field of Search ............ 260/244; 424/248, 232

[56] References Cited
UNITED STATES PATENTS
3,598,814  8/1971  Reisner et al. ............... 260/244 R Primary Examiner—Albert T. Meyers
Assistant Examiner—Douglas W. Robinson
Attorney, Agent, or Firm—Stanley E. Anderson, Jr.; William H. Nicholson; Harry E. Westlake, Jr.

[57] ABSTRACT
Compounds of the general formula:

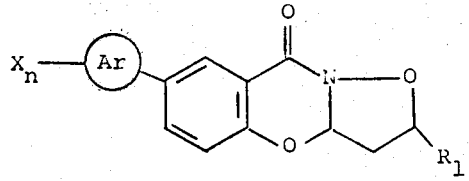

wherein is aryl are prepared by condensation of a substituted salicylhydroxamic acid with an acrolein are antiinflammatory, analgesic, and antipyretic agents.

4 Claims, No Drawings

3,3A-DIHYDRO-2H,9H-ISOXAZOLO(3,2-B)(1,3)BENZOXAZIN-9-ONES

This invention relates to novel chemical compounds, processes for their preparation, and their use in the treatment of inflammation, pain and fever.

The compounds of the present invention, which can be classified as 3,3a-dihydro-2H,9H-isoxazolo(3,2-b)(1-3)benzoxazin-9-ones, are represented by the following general formula:

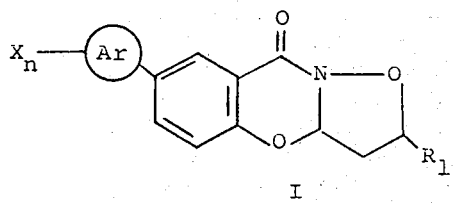

Ar is phenyl, thiazolyl, or pyrrolyl; wherein n is 0–2;

X is halo such as chloro or fluoro; and $R_1$ is hydrogen or lower alkyl.

A preferred embodiment of the novel compounds of this invention is the compound of Formula I, wherein Ar is phenyl. Still more preferred are those compounds, wherein Ar is phenyl and X is fluoro.

As used herein and in the claims, the term "lower alkyl" signifies an alkyl group having from 1–5 carbon atoms.

The novel compounds of the invention can be prepared according to the following synthetic route:

wherein Y is halo. The reaction is carried out at a temperature of from about 20° to about 70°C. The intermediate, which can be classified as 2-(2-haloalkyl)-2,3-dihydro-3-hydroxy-4H-1,3-benzoxazin-4-ones, is also a novel compound.

Cyclization of the intermediate compound under basic conditions yields the desired product. Said cyclization can be carried out using organic or inorganic bases in the appropriate solvent.

The intermediate salicylhydroxamic acids are prepared by well-known techniques as shown by Steps A and B of the Reaction Scheme such as treatment of hydroxylamine with an ester of the appropriate salicylic acid.

The novel compounds of this invention are useful antiinflammatory, analgesic and antipyretic agents upon oral administration to warm blooded animals, including humans, preferably with a non-toxic pharmaceutically acceptable carrier, and preferably in tablet or capsule form.

The non-toxic pharmaceutical carrier may be for example, either a solid or a liquid. Exemplary of solid carriers are lactose, corn starch, gelatin, talc, Sterotex, stearic acid, magnesium stearate, terra alba, sucrose, agar, pectin, Cabo-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

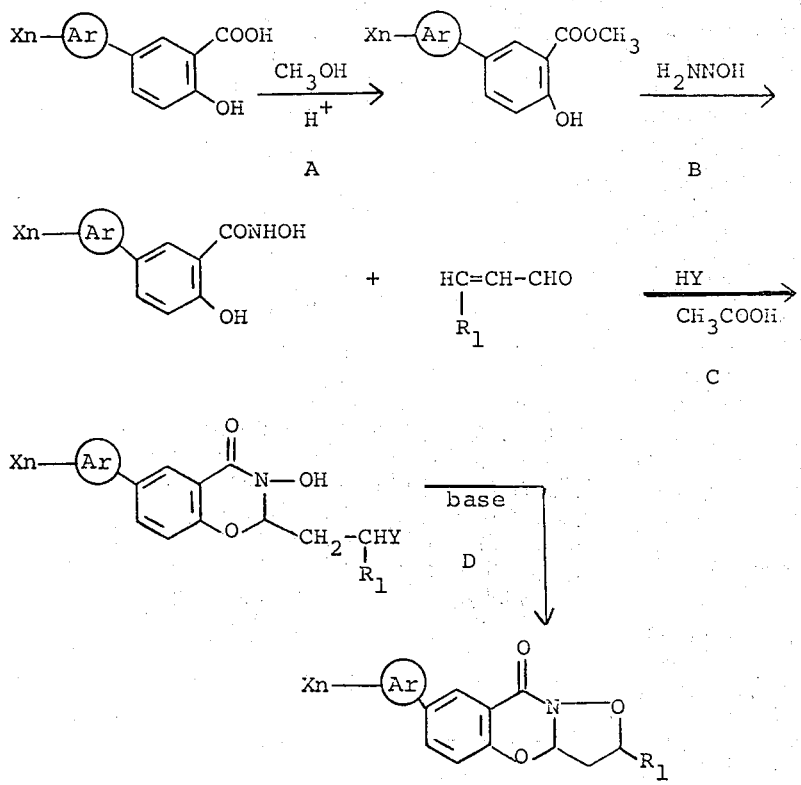

Reaction Scheme

In Reaction Step C, a salicylhydroxamic acid is reacted with a substituted or unsubstituted acrolein, in a medium such as acetic acid or ethanol in the presence of hydrogen halide to yield the desired intermediate Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension.

The active ingredient, namely, the compounds of Formula I are administered in an amount of from about 1 mg. to 140 mg. per kg. body weight per day, preferably from about 2 mg. to 70 mg. per kg. body weight per day.

It should be understood that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, time of administration, route of administration, rate of excretion, drug combination, reaction sensitivities and severity of the particular disease.

EXAMPLE 1

7-(2,4-Difluorophenyl)-3,3a-dihydro-2H,9H-isoxazolo (3,2-b) (1,3)benzoxazin-9-one Step A: Preparation of methyl 5-(2,4-difluorophenyl)-salicylate A solution of 5.0 grams of 5-(2,4-difluorophenyl)salicylic acid in 20 ml. of methanol and 1 ml. of concentrated sulfuric acid is heated at reflux for 5 hours. The mixture is then cooled and partitioned between (75:150 ml.) water and ethyl acetate and the organic layer washed with dilute sodium bicarbonate solution. The organic layer is then dried over magnesium sulfate and concentrated in vacuo to yield, as an oil, methyl 5-(2',4'-difluorophenyl)salicylate.

Step B: Preparation of 5-(2,4-difluorophenyl)-2-hydroxybenzhydroxamic acid

Separate 50 mg. of 0.67 molar hydroxylamine hydrochloride in 240 ml. methanol and of 2 mole of potassium hydroxide in 140 ml. methanol are prepared at their boiling points, cooled to 30° and the second solution is added to the first. After cooling in ice 0.33 mole of methyl 5-(2,4-difluorophenyl)salicylate is added with shaking. The solution is filtered and the filtrate let stand at room temperature. Crystals of dipotassium 5-(2,4-difluorophenyl)-2-hydroxybenzhydroxamic acid separate.

A mixture of the salt and an equivalent amount of dilute acetic acid is stirred and heated to give a clear solution and then cooled to 0°. The hydroxamic acid separates.

Step C: Preparation of 6-(2,4-difluorophenyl)-2-(2-chloroethyl)-2,3-dihydro-3-hydroxy-4H-1,3-benzoxazin-4-one Hydrogen chloride gas (36.5 g.) is added to 300 ml. of glacial acetic acid at about 10°C. To one-half of this solution is added 246 g. of 5-(2,4-difluorophenyl)-2-hydroxybenzhydroxamic acid, and then 28 g. of acrolein and the remaining half of the hydrogen chloride-acetic acid mixture is introduced simultaneously with stirring and cooling at a rate to maintain a temperature of 25° to 50°C. The resulting mixture is stirred and heated at 50°C. for 1½ hours and then allowed to stand at room temperature for 2 hours. Ice is then added and solid is removed, washed well with water, and air dried.

Step D: Preparation of 7-(2,4-difluorophenyl)-3,3a-dihydro-2H,9H-isoxazolo(3,2-b) (1,3)benzoxazin-9-one 124 G. of crude 6-(2,4-difluorophenyl)-2-(2-chloroethyl)-2,3-dihydro-3-hydroxy-4H-1,3-benzoxazin-4-one is dissolved in 150 ml. of 10% aqueous solution of sodium hydroxide. After several minutes, a solid precipitated. Mixture is diluted with water, filtered and solid is washed with water and air dried. The product is recrystallization from ethyl acetate.

Employing the procedure of Example 1, as outlined in the Reaction Scheme, but substituting for the 5-(2,4-difluorophenyl)salicylic acid used therein, an equimolar amount of the substituted phenylsalicylic acids identified in Table 1, there are produced in sequence, the corresponding methyl esters, hydroxamic acids, 2-chloroethylbenzoxazinones and isoxazolobenzoxazinones also identified in Table 1.

TABLE 1

| Example | Xn—(Ar)— | R₁ |
|---|---|---|
| 2 | 2-fluorophenyl | H |
| 3 | 4-fluorophenyl | H |
| 4 | pyridyl | H |
| 5 | thiazolyl | H |
| 6 | thiazolyl | H |
| 7 | thiazolyl | H |
| 8 | 2-chlorothiazolyl | H |

Similarly, by employing the procedure described in Example 1, Steps C and D as outlined in the Reaction Scheme, and the salicylic hydroxamic acid starting materials described in Example 1 through 8 but substituting for the acrolein used in Step C, an equimolar amount of crotonaldehyde, there are produced in sequence the 2-(2-chloropropyl)benzoxazinones and isoxazolobenzoxazinones identified in Table 2.

TABLE 2

| Example | Xn—(Ar)— | R₁ |
|---|---|---|
| 9 | 2,4-difluorophenyl | —CH₃ |
| 10 | 2-fluorophenyl | —CH₃ |

TABLE 2—Continued

| Example | Xn—(Ar)— | R₁ |
|---|---|---|
| 11 | F—⟨phenyl⟩— | —CH₃ |
| 12 | pyrrolyl (N—) | —CH₃ |
| 13 | thiazolyl | —CH₃ |
| 14 | thiazolyl | —CH₃ |
| 15 | thiazolyl | —CH₃ |
| 16 | Cl-thiazolyl | —CH₃ |

EXAMPLE 17

Dry Filled Capsule

A dry filled capsule is prepared from the following ingredients:

| Compound | Mg. |
|---|---|
| 7-(2,4-difluorophenyl)-3,3a-dihydro-2H,9H-isoxazolo(3,2-b)(1,3)benzoxazin-9-one | 300 |
| corn starch | 150 |
| Cab-O-Sil | 5 |
| Sterotex | 15 |

The active ingredient in the above formulation can be substituted for by any of the other active compounds of this invention described in Examples 2 through 16.

What is claimed is:

1. A compound of structural formula:

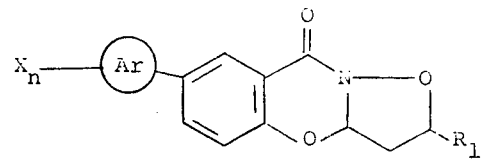

wherein (Ar) is phenyl, thiazolyl, or pyrrolyl;
X is chloro or fluoro;
$n$ is 0–2; and
R₁ is hydrogen or $C_{1-3}$ alkyl.

2. The compound of claim 1 wherein (Ar) is phenyl.
3. The compound of claim 1 wherein (Ar) is phenyl and X is fluoro.
4. The compound of claim 1, of formula:

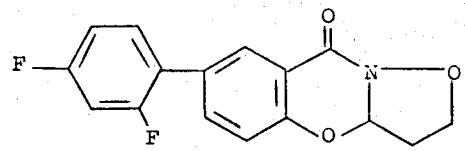

* * * * *